Patented June 7, 1932

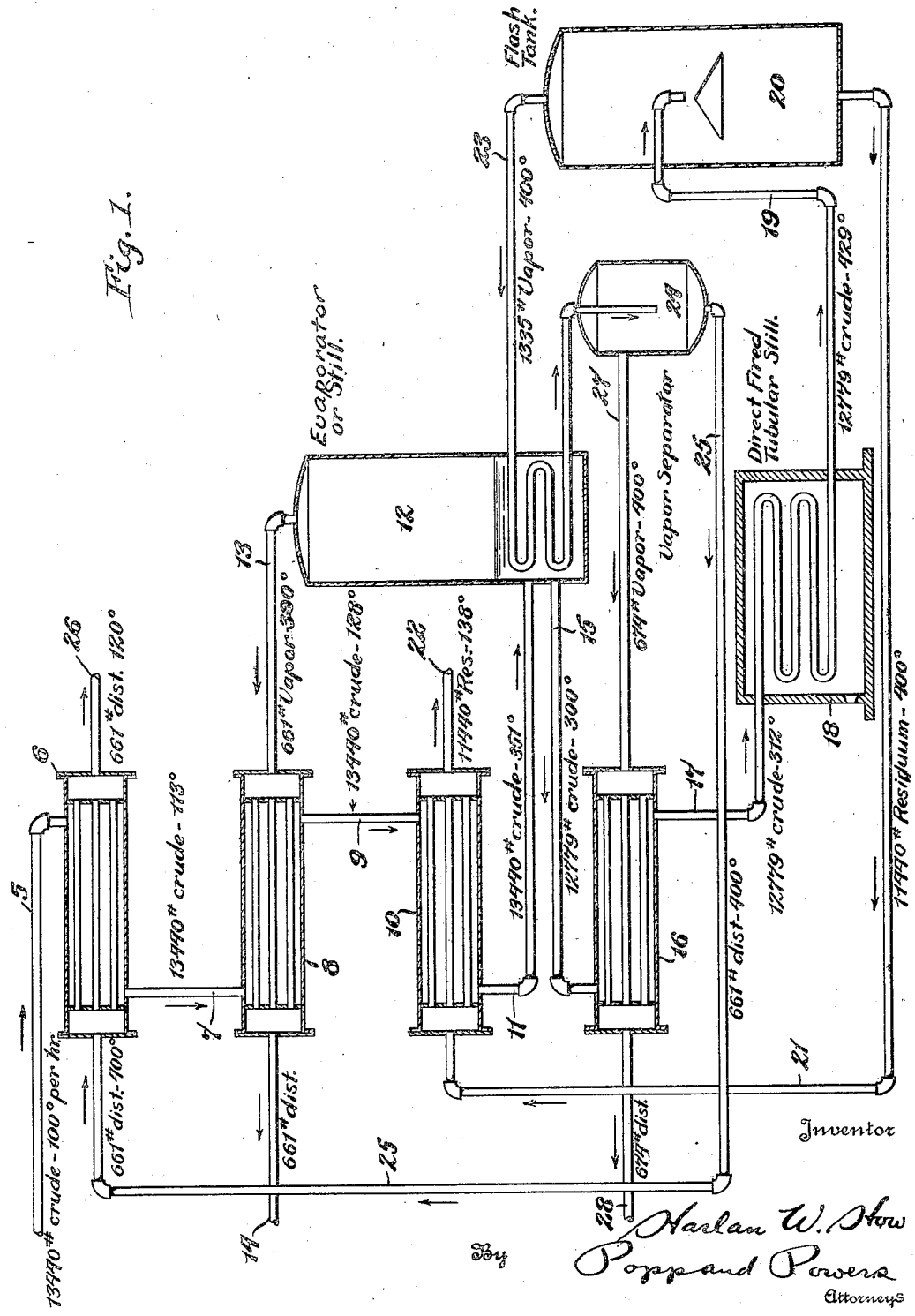

1,862,363

UNITED STATES PATENT OFFICE

HARLAN W. HOW, OF WARREN, PENNSYLVANIA, ASSIGNOR TO STRUTHERS WELLS-TITUSVILLE CORPORATION, OF WARREN, PENNSYLVANIA, A CORPORATION OF MARYLAND

PETROLEUM DISTILLATION SYSTEM

Application filed July 11, 1929. Serial No. 377,541.

This invention relates to a petroleum distillation system, and more particularly to a system for the fractional distillation of crude petroleum oil to separate and obtain the light oils, illuminating oils, lubricating oils and tar residue, etc. constituting crude petroleum although the present invention can also be used in the fractional distillation of other similar liquids.

In the fractional distillation of crude petroleum as heretofore carried out, the general practice has been to conduct the incoming crude petroleum through heat interchangers where it is heated by the cooling of the various fractions distilled off or by the condensing of portions of certain of the vapors distilled off. From these heat interchangers, the general practice has been to conduct the crude petroleum to a pipe still or a shell still where the entire incoming volume of crude oil is directly heated by means of fire. From this point on the prior systems for distilling crude petroleum vary greatly, but the systems are practically all identical in that all of the incoming crude petroleum is first heated by fire, the distillation of the various fractions being effected after this direct fire heating.

The principal object of the present invention is to provide a system for the fractional distillation of crude petroleum in which the fire heat is not applied until practically the last step, or, in other words, fire heat is not used except to take off the higher boiling fraction, the lower boiling fraction being taken off by means of the latent heat of the distillate or the heat of the residuum from this distillation of this highest boiling fraction. By this means, the lower boiling point fraction is taken off by means of the latent and sensible heat or either of the distillate, and since the fire is applied at the last step or fraction, the liquid to be fractionated is not heated to an unnecessarily high degree, to take off the lower boiling point fraction. This system also is more readily kept in good working condition, is more easily controlled, is less liable to coke up and requires less heat to operate than the systems now in use.

A further object is to provide such a fractional distillation system in which there is not only an unusually large saving in heat expenditure, but also in which only a fraction of the condensing and cooling water is required as compared with conventional methods.

In the accompanying drawings:

Figure 1 is a schematic representation of a simple form of system for the fractional distillation of crude petroleum made in accordance with the present invention.

Figure 2 is a view similar to Figure 1 but showing an elaboration of the system shown in Fig. 1.

Similar reference numerals refer to like parts in each figure of the drawings.

In its general organization this invention comprises an evaporator, a high boiling point fraction heater heated by direct fire heat, pipe lines for conducting the crude petroleum through the evaporator and thence through said heater and a flash tank, means conducting one of the products of the distillation in the flash tank or still i. e. the distillate or the residuum, through the tubes of the evaporator to raise the temperature of the liquid therein to evaporate a lower boiling point fraction, and means for preheating the crude petroleum through the latent or sensible heat, or either, derived from the vapor from the evaporator and flash tank and the residuum from the still.

The arrangement of the form of the invention shown in Fig. 1 is as follows:

The crude petroleum is admitted to the system through a crude petroleum inlet line 5 which is connected to a heat exchanger 6. From this heat exchanger 6 the crude petroleum is conducted through a line 7 to a second heat exchanger 8 and thence through a line 9 to another heat exchanger 10. From this last heat exchanger 10, the crude petroleum passes through a line 11 to an evaporator or still 12. This evaporator or still may be of any usual and well known construction and is heated in a manner hereinafter described, the vapor from this evaporator or still passing through a vapor outlet line 13 which is connected with the heat exchanger 8, thereby preheating the incoming crude petroleum and the vapor from the line 13 being condensed and passing out through a vapor outlet pipe 14 as the lowest boiling point fraction.

The crude petroleum less the distillate passing off in the evaporator 12 then passes through a line 15, heat exchanger 16 and line 17 to a direct fired tubular heater 18 where it is heated by fire heat. From this direct fired still, the crude petroleum passes through a line 19 to a flash tank 20 or still which may be of any usual and well known construction. The residuum from this flash tank passes out through a line 21 which is connected to the heat exchanger 10 and raises the temperature of the incoming crude petroleum before it enters the evaporator or still 12, the residuum passing out through an outlet pipe 22.

The vapor from the flash tank 20 passes out through a line 23 which passes through the crude petroleum in the evaporator or still 12 and serves to evaporate the lower boiling point constituents thereof and discharges into a vapor separator 24. The condensate collected in the bottom of this vapor separator passes out through a line 25 which connects with the first heat exchanger 6 so as to initially heat the incoming crude petroleum and this distillate is discharged through an outlet pipe 26. The vapor from the vapor separator passes out through an outlet line 27 which is connected with the heat exchanger 16 so as to heat the crude petroleum before it is subjected to direct fire heat, this vapor being condensed in the heat exchanger 16 and passing off as distillate through the outlet pipe 28.

As one example of the operation of the present invention, a 15% cut or fraction based on 1000 barrels of petroleum per day has been assumed, but it is to be understood that this amount and the specific temperatures referred to are purely by way of example and are in no way intended to limit the scope of this invention.

With the above assumed example based on 1000 barrels per day, the crude petroleum is admitted through the crude petroleum inlet pipe 5 at the rate of 13440 pounds per hour after having been heated to a temperature of 100° F. This crude petroleum enters the first heat exchanger 6 where its temperature is raised to 113° F. by the condensate separated out by the vapor separator 24 which condensate is conducted through the line 25 and the tubes of this first heat exchanger 6. The crude petroleum then passes from the heat exchanger 6 at a temperature of 113° F. through the line 7 and through the heat exchanger 8 where the temperature of the crude petroleum is raised to 128° F. by the vapor from the evaporator or still 12 which enters this heat exchanger at a temperature of 330° F. and at the rate of 661 pounds per hour. The crude petroleum then passes through the line 9 and enters the third heat exchanger 10 where its temperature is raised to approximately 351° by the residuum from the flash tank 20 which enters this heat exchanger 10 at the rate of 11440 pounds per hour and at a temperature of 400° F.

From the heat exchanger 10 the crude petroleum at a temperature of 351° F. enters the heater 12 where it is heated and evaporated by the vapor from the flash tank 20 which passes through the tubes of the evaporator or still at the rate of 1335 pounds per hour and at a temperature of 400° F. At this temperature the first fraction distills off, 661 pounds of vapor passing from the evaporator or still 12 at 300° F. through the outlet line 13, and heat exchanger 8, where it raises the temperature of the incoming crude petroleum from 113° F. to 128° F., as described, the vapor condensing in this heat exchanger 8 and passing out through the outlet pipe 14 which can conduct it to water cooled heat exchangers or coolers (not shown).

The balance of 12779 pounds of crude petroleum not distilled off in the evaporator or still 12 leaves through the outlet line 15 at a temperature of 300° F. and enters the heat exchanger 16 where its temperature is raised to 312° F. by the vapor from the vapor separator 24 which vapor passes through the tubes of this heat exchanger 16 at the rate of 674 pounds per hour and at a temperature of 400° F. This crude petroleum then leaves the heat exchanger 16 through the line 17 and enters the heater 18 where its temperature is raised by fire heat to 429° F.

The crude petroleum therefore leaves the heater 18 at the rate of 12779 pounds per hour and at a temperature of 429° F. and enters the flash tank 20. From this flash tank 1335 pounds of the petroleum is vaporized and passes out through the outlet line 23 at a temperature of 400° F. and the balance of 11440 pounds of residuum passes out through the line 21 and passes through the heat exchanger 10 and residuum outlet 22, this residuum in passing through the tubes of the heat exchanger 10 at 400° F. raising the temperature of the incoming crude petroleum from 128° to 351° F.

The 1335 pounds of vapor leaving the flash tank 20 at 400° F. through the line 23 passes through the tubes of the evaporator or still 12 and evaporates the low boiling point fraction of the crude petroleum therein. There is not sufficient heat required in the evaporator or still 12 to use up all the latent heat of the vapor, and the uncondensed vapor and condensed distillate pass to the vapor separator 24 where the vapor is trapped off in the amount of 674 pounds at 400° F. and passes through the line 27, heat exchanger 16 and outlet pipe 28. In passing through the tubes of the heat exchanger 16 this vapor raises the temperature of the 12779 pounds of crude petroleum leaving the tubular still or evaporator 12 from 300° F. to 312° F. 661 pounds of condensed distillate are trapped off by the vapor separator 24, this condensate passing through the line 25 at 400° F., and through the first heat exchanger 6 and the outlet pipe 26. In going through the tubes of the heat exchanger 6, this distillate raises the temperature of the incoming crude petroleum from 100° F. to 133° F.

It is therefore apparent that by this system there are four fractions: that taken off through the outlet pipe 14, that taken off through the outlet pipe 28, that taken off through the outlet pipe 26 and the residuum taken off through the outlet pipe 22. It is also apparent that the lower boiling point fraction is distilled or evaporated in the tubular still or evaporator 12 wholly by the heat of the distillate of the higher boiling point fraction and that fire heat is not used except to take off the highest boiling point fraction.

It is obvious that the number of evaporators or stills 12 can be increased to take care of various fractions, using in each evaporator or still 12 the latent and sensible heat, or either, of the next higher boiling point fraction distillate to effect the distillation in each evaporator or still 12, the initial or fire heat not being applied until it is necessary to take off the highest boiling fraction. For instance, with the assumed temperatures used herein as an example, the last two fractions containing gas oil and wax distillate would be the only two that would be subject to fire heat, the kerosene, naphtha, and gasoline fractions being split off by the heat, both latent and sensible, or either, in the next higher boiling point fraction. In other words, the distillation of the gas oil would furnish the heat to evaporate or distill the kerosene and the heat, both latent and sensible, or either, in the kerosene would be used to distill the naphtha; and the heat, both latent and sensible, or either, in the naphtha, would then be used to distill off the gasoline. This would then leave the gasoline in vapor form to be condensed. This heat of the gasoline could then be imparted to different fractions, or to the incoming crude petroleum, as may be desired to secure a proper heat balance. It is also apparent that instead of passing the vapor from the flash tank 20 through the evaporator or still 12 that the residuum from the flash tank could be used for this purpose. In this arrangement the residuum pipe 21 would be connected with the tubes of the evaporator or still 12 and the excess heat from both the residuum and the vapor from the flash tank could be imparted to the incoming crude petroleum by a suitable arrangement of heat exchangers.

The modified form of the invention illustrated in Fig. 2 is identical with the form of the invention shown in Fig. 1 except that the still or evaporator 12 has been provided with a fractionating tower 29 and the heat exchanger 8 has been placed on top of the fractionating tower to provide the reflux instead of being connected to the still or evaporator 12 by the line 13 as in the form of the invention shown in Fig. 1.

This fractionating tower 29 can be of any acceptable design such as a tower having bubble caps and plates or a packed tower using one of the various forms of quartz or metallic rings, and is shown as the conventional bubble tower having spaced plates which carry the usual bubble caps, these bubble caps being arranged to cause the vapor from the evaporator 12 to bubble through the liquid flowing over each plate as the vapor passes up through the bubble tower. The vapor from the evaporator or still 12 and the bubble tower 29 in passing around the tubes of the heat exchanger 8 raises the temperature of the incoming crude petroleum from 113° F. to 128° F. as in the form of the invention shown in Fig. 1, and the condensate is returned to the bubble tower 29 through the reflux line 30 or a part or all can be withdrawn through the line 31 and outlet pipe 14. The distillate can also be withdrawn from the upper plates of the bubble tower by means of a series of valve controlled taps 32 connecting the outlet pipe 14 with the fractionating or bubble tower in the usual and well known manner. It will be understood that where a larger number of stills or evaporators 12 are employed to provide additional fractions of the distillate, that each evaporator or still 12 can be equipped with a suitable fractionating tower 29 as described.

It is not intended to confine the scope of this invention to any quantities or temperatures such as are used by way of example in the foregoing description, nor to any specific type or form of equipment.

The present invention provides a petroleum distillation system which requires considerably less heat than conventional systems, it having been found that in an installation made according to the present invention the heat expenditure is only about twenty five per cent of that theoretically required to do the work through the usual method. In addition to the large saving in heat expenditure, only a fraction of the condensing and cooling water is required as compared with conventional methods. The present systems are also readily kept in good working condition, are easily controlled and are not liable to coke up.

I claim as my invention:

1. In a fractional distillation system, an evaporator, a high boiling point still, means for heating the liquid in said still, means for conducting the liquid to be fractionated through said evaporator and thence through said still, means for conducting the distillate from said still through said evaporator to raise the temperature of the liquid therein to effect the evaporation of the lower boiling point fraction, a vapor separator, means for conducting said distillate from said evaporator to said vapor separator to separate the uncondensed vapor and the condensate from said distillate, and means for raising the temperature of said liquid before entering said still through heat derived from said uncondensed vapor from said vapor separator.

2. In a fractional distillation system, an evaporator, a high boiling point fraction still, means for heating the liquid in said high boiling point fraction still, means for conducting the liquid to be evaporated through said evaporator and thence through said still, means for conducting the distillate from said still through said evaporator to raise the temperature of the liquid therein to effect the evaporation of the low boiling point fraction, a vapor separator, means for conducting the distillate from said still to said vapor separator after leaving said evaporator, means for raising the temperature of said liquid before entering said evaporator through heat derived from the condensate from said vapor separator, means for further raising the temperature of the liquid before entering said evaporator through heat derived from the vapor from said evaporator, means for further raising the temperature of said liquid before entering said evaporator through heat derived from the residuum of said still, and means for raising the temperature of said liquid upon leaving said evaporator and entering said still through heat derived from the vapor from said vapor separator.

3. In a fractional distillation system, an evaporator, a reflux fractionating tower associated with said evaporator, a heater, means for heating said heater, a flash tank, a vapor separator, means for conducting the liquid to be fractionated successively through said fractionating tower, evaporator, heater and flash tank, means for conducting the vapor from said flash tank through said evaporator to raise the temperature of the liquid therein to effect the evaporation of a low boiling point fraction, means for conducting the vapor from said flash tank after leaving said evaporator to said vapor separator, means for raising the temperature of said liquid before entering said fractionating tower through heat derived from the condensate from said vapor separator, means for further raising the temperature of the liquid before entering said fractionating tower through heat derived from the vapor from said fractionating tower, means for further raising the temperature of said liquid before entering said fractionating tower through heat derived from the residuum from said flash tank and means for raising the temperature of said liquid upon leaving said evaporator and before entering said still through heat derived from the vapor from said vapor separator.

4. In a fractional distillation system, an evaporator, a high boiling point still, means for heating the liquid in said still, means for conducting the liquid to be fractionated through said evaporator and thence through said still, means for heating said evaporator through heat derived from the distillate from said still to effect evaporation of the lower boiling point fractions in said evaporator, means for separating an intermediate boiling point fraction subsequent to the passage of the distillate from said still through said evaporator, means for heating the liquid entering said evaporator through heat derived from the distillate thereof and means for heating the liquid entering said still through heat derived from the distillate of said intermediate boiling point fraction.

5. In a fractional distillation system, an evaporator, a high boiling point still, means for heating the liquid in said still, means for conducting the liquid to be fractionated through said evaporator and thence through said still, means for heating said evaporator through heat derived from the distillate from said still to effect evaporation of the lower boiling point fraction in said evaporator, means for separating the uncondensed vapor and condensate from the distillate from said still subsequent to its passage through said evaporator and means for raising the temperature of the liquid before entering said still through heat derived from said uncondensed vapor.

In testimony whereof I hereby affix my signature.

HARLAN W. HOW.